(12) United States Patent
Kawabe

(10) Patent No.: US 8,300,350 B2
(45) Date of Patent: Oct. 30, 2012

(54) MAGNETIC DISK DRIVE USING OFFSET IN POSITIONING HEAD TO READ DATA AND HEAD POSITIONING METHOD

(75) Inventor: Takayuki Kawabe, Sagamihara (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/170,137

(22) Filed: Jun. 27, 2011

(65) Prior Publication Data

US 2012/0081810 A1    Apr. 5, 2012

(30) Foreign Application Priority Data

Oct. 5, 2010   (JP) ................ 2010-225940

(51) Int. Cl.
*G11B 5/596* (2006.01)
*G11B 5/03* (2006.01)
*G11B 27/36* (2006.01)

(52) U.S. Cl. ............... 360/77.02; 360/66; 360/31
(58) Field of Classification Search .......... None
See application file for complete search history.

(56) References Cited

U.S. PATENT DOCUMENTS

2005/0180267 A1* 8/2005 Jeong et al. ............ 368/96
2006/0132954 A1* 6/2006 Wada et al. ............ 360/48

FOREIGN PATENT DOCUMENTS

| JP | 7-65389 | 3/1995 |
|---|---|---|
| JP | 11-353828 | 12/1999 |
| JP | 2004-030853 | 1/2004 |
| JP | 2004-303303 | 10/2004 |
| JP | 2010-218613 | 9/2010 |

OTHER PUBLICATIONS

Japanese Application No. 2010-225940 Office Action (Nov. 15, 2011) (English translation attached).

* cited by examiner

*Primary Examiner* — Andrew L Sniezek
(74) *Attorney, Agent, or Firm* — Patterson & Sheridan, LLP

(57) ABSTRACT

According to one embodiment, a magnetic disk drive comprises a write count memory, a read offset setting module and a controller. The write count memory stores a write count for each track or for each zone on a disk. The read offset setting module sets, in accordance with a write count for an adjacent track to a target track or for a zone to which the adjacent track belongs, an offset from a predetermined position on the target track in a read position in which a head is to be positioned when the head is positioned on the target track for data read. The write count is stored in the write count memory. The controller positions the head in a position shifted from the predetermined position by the set offset.

8 Claims, 9 Drawing Sheets

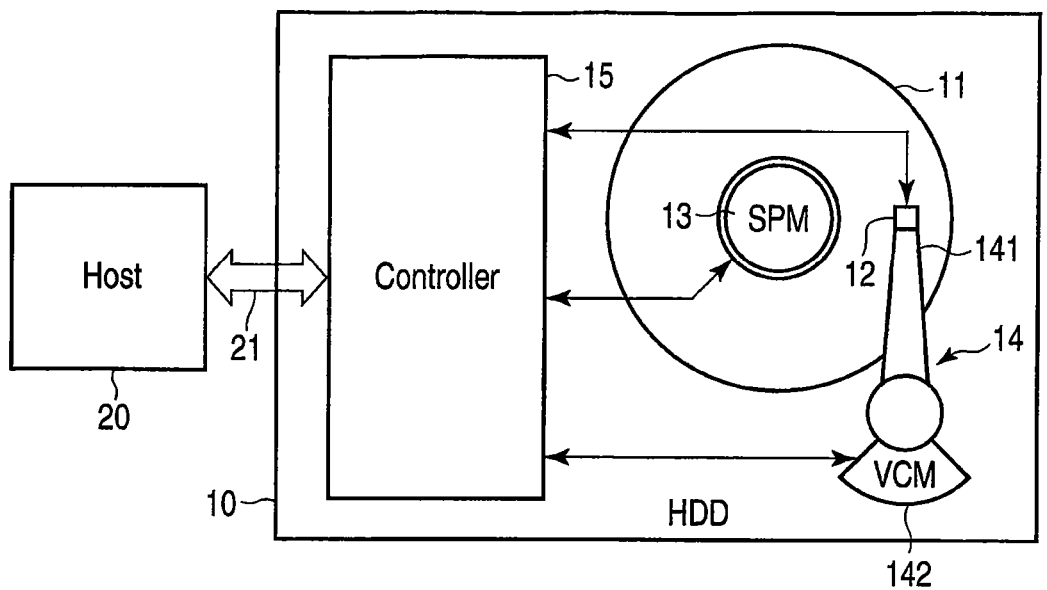
F I G. 1
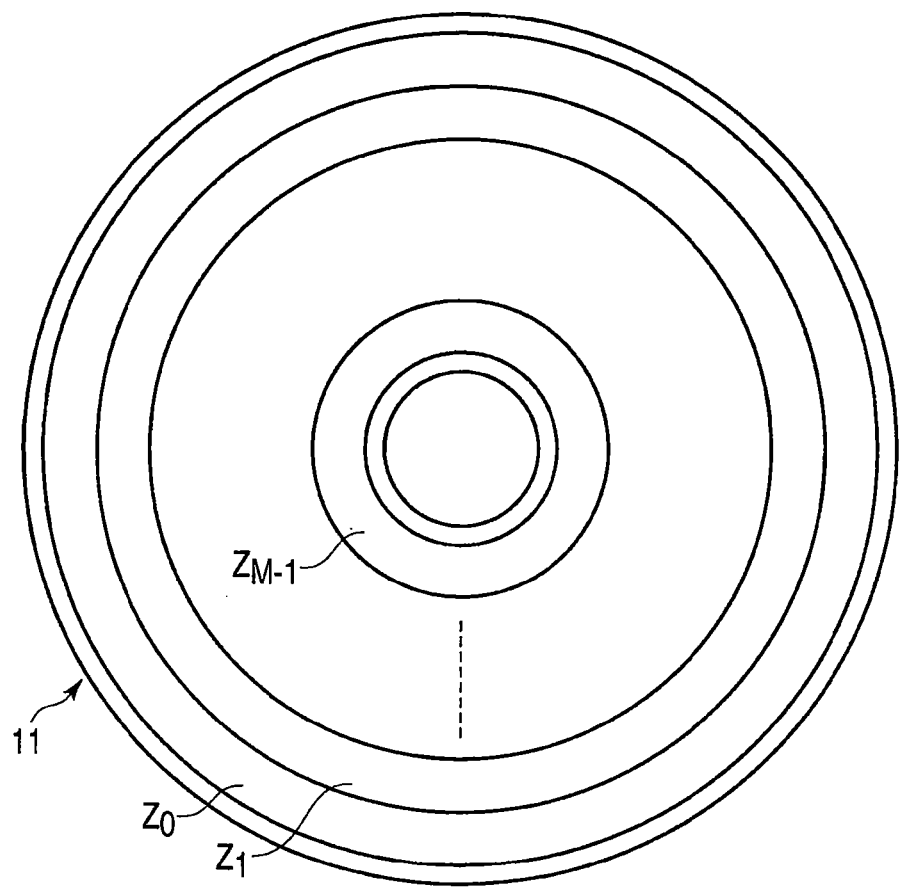
F I G. 2

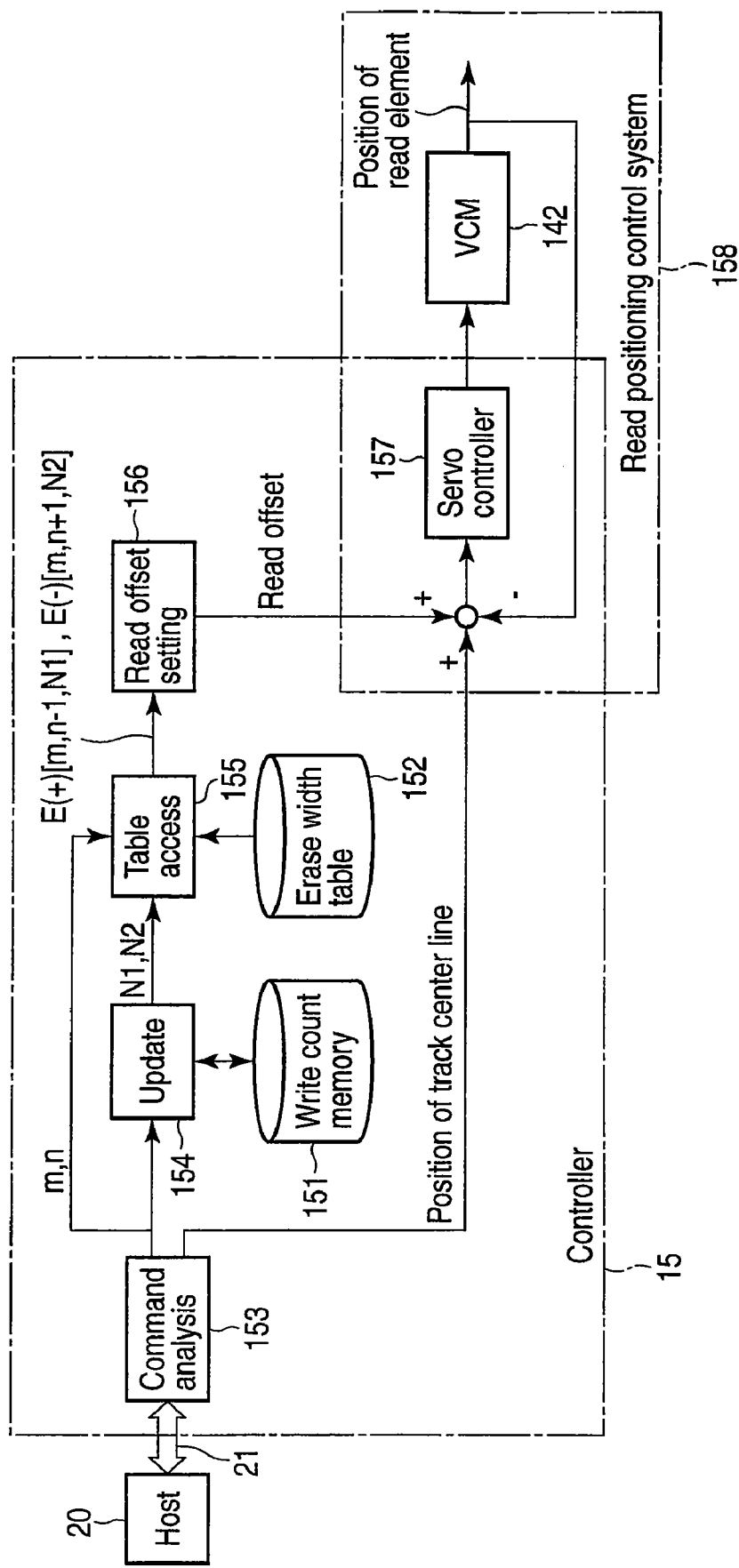
F I G. 6

Erase width table 152

| Head \ Cylinder \ Write count | 0 | | ... | p-1 | | ... | 0 | | ... | p-1 | | ... |
|---|---|---|---|---|---|---|---|---|---|---|---|---|
| | 0 | 1 | | 0 | 1 | | 0 | 1 | | 0 | 1 | |
| 1 | E(+)[0,0,1] | --- | --- | E(+)[0,p-1,1] | --- | --- | E(-)[0,0,1] | --- | --- | E(-)[0,p-1,1] | --- | --- |
| 2 | E(+)[0,0,2] | --- | --- | E(+)[0,p-1,2] | --- | --- | E(-)[0,0,2] | --- | --- | E(-)[0,p-1,2] | --- | --- |
| ... | ------ | ------ | ------ | ------ | ------ | ------ | ------ | ------ | ------ | ------ | ------ | ------ |
| q | E(+)[0,0,q] | --- | --- | E(+)[0,p-1,q] | --- | --- | E(-)[0,0,q] | --- | --- | E(-)[0,p-1,q] | --- | --- |

F I G. 8

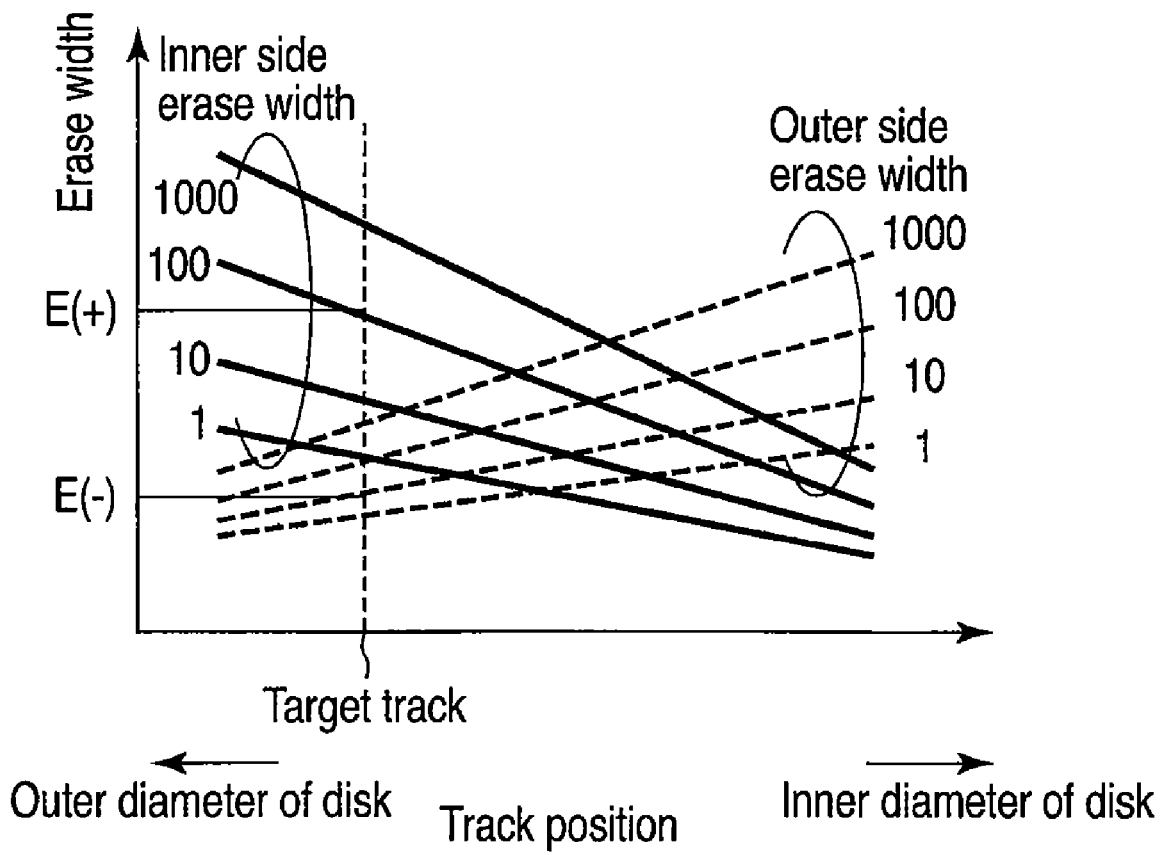
F I G. 9

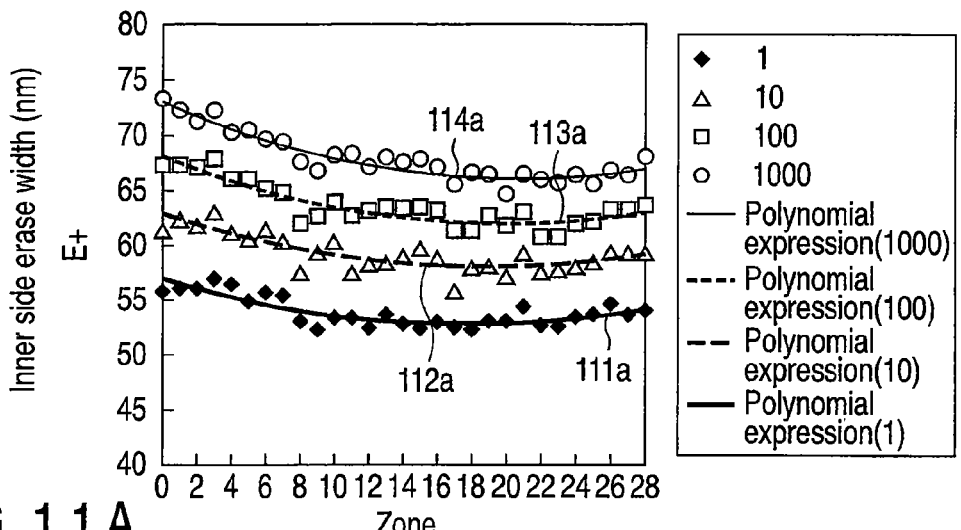
F I G. 11 A
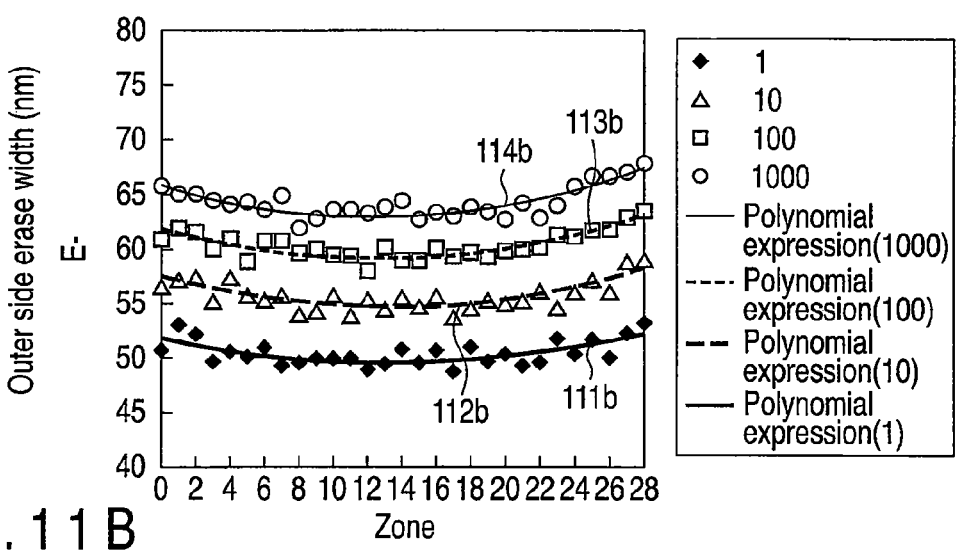
F I G. 11 B
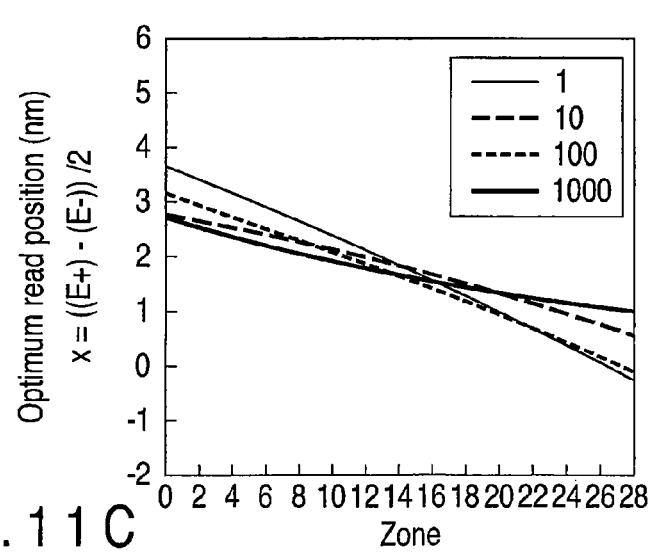
F I G. 11 C

MAGNETIC DISK DRIVE USING OFFSET IN POSITIONING HEAD TO READ DATA AND HEAD POSITIONING METHOD

CROSS-REFERENCE TO RELATED APPLICATIONS

This application is based upon and claims the benefit of priority from Japanese Patent Application No. 2010-225940, filed Oct. 5, 2010; the entire contents of which are incorporated herein by reference.

FIELD

Embodiments described herein relate generally to a magnetic disk drive using an offset in positioning a head to read data and a head positioning method.

BACKGROUND

In recent years, as the capacity of a magnetic disk drive has been getting higher, the recording density and track density have been getting higher. As the track density has been getting higher, the interval between adjacent tracks (i.e., the track pitch) on a disk (magnetic disk) has been getting narrower.

As the track pitch has been getting narrower, data magnetically written in tracks adjacent to a target track might be magnetically degraded when data is magnetically written to the target track with a head (magnetic head). That is, the magnetization of adjacent tracks might be reduced. The reason is that a magnetic field generated by the head includes a component that makes no contribution to data writing, that is, a leakage magnetic field.

The effect of the leakage magnetic field on adjacent tracks is accumulated each time data is written to the target track. Therefore, as the number of times data is written to the target track increases, the magnetization of adjacent tracks are reduced further. The phenomenon of a decrease in the magnetization (i.e., demagnetization) of adjacent tracks is called a side erase.

As the demagnetization of adjacent tracks (or side erase) progresses, the error rate in reading data from the adjacent tracks increases. Before long, even if an attempt is made to restore the data in the adjacent tracks making full use of an error correction code (ECC), it will be difficult to restore the data. As a result, the data will be lost.

To overcome this problem, a recent magnetic disk drive requires track refreshing (rewriting) for restoring the magnetization of adjacent tracks before the progress of the demagnetization of adjacent tracks makes it impossible to read data from the adjacent tracks. That is, a write count is monitored for each zone or for each track. When the write count has exceeded a threshold value, each track in the corresponding zone or the corresponding track (more specifically, a track adjacent to a track whose write count has exceeded the threshold value) is refreshed.

Track refreshing is known as the operation of reading data from a demagnetized track and writing the read data to the track again. Rewriting data to the track (i.e., track refreshing) causes the magnetization of the track to be restored.

The demagnetization of adjacent tracks (side erasing) also takes place due to position errors in positioning the head on a target track to which data is to be written. In recent years, to cope with this problem, one known magnetic disk drive has a write inhibit slice set in each sector on a disk. In such a magnetic disk drive, when data is written to a target sector on a target track, a shift of the head position from the center line of the target track is detected. When the detected shift of the head position has exceeded the write inhibit slice corresponding to the target sector, the target sector is inhibited from being written to. This can prevent the data in a track adjacent to the target track from being erased (or rewritten) due to the shift of the head position.

As described above, the recent magnetic disk drive performs track refreshing when the write count for each zone or each track has exceeded the threshold value. This makes it possible to prevent the data in a track from being unable to be read due to demagnetization. However, when track refreshing is performed frequently, the performance of the magnetic disk drive decreases. Therefore, the threshold value of the write count tends to be set relatively high.

Even if the write count, for example, the number of times a second track adjacent to a first track has been written to, is in a range not exceeding the threshold value, the error rate in reading the first track is liable to increase as the write count increases. When the threshold value is set relatively high, this tendency increases. As described above, when the error rate in reading a track has increased, the number of times the track is retried being read from increases. Then, it takes a long time to read data from the track; on the contrary, the performance of the magnetic disk drive might decrease.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a block diagram showing an exemplary configuration of an electronic device with a magnetic disk drive according to an embodiment;

FIG. 2 is a conceptual diagram schematically showing the format of a disk applied to the embodiment;

FIGS. 4A, 4B and 4C show the results of measuring, on each track in the outer diameter zone #0, the middle diameter zone #14 and the inner diameter zone #28 of the disk respectively, profiles of the probability of read error for each write count when data is written to tracks adjacent to a target track to be read from;

FIG. 6 is a block diagram showing an exemplary configuration of the main part of a controller applied to the embodiment together with an exemplary configuration of a peripheral part related to the controller;

FIG. 8 shows an example of the data structure of an erase width table applied to the embodiment;

FIG. 9 is a diagram to explain the concept of an erase width corresponding to the write count for each track shown in the erase width table applied to the embodiment;

FIG. 11A shows the result of measuring an inner side erase width for each zone in the embodiment;

FIG. 11B shows the result of measuring an outer side erase width for each zone in the embodiment; and FIG. 11C shows an example of curves representing the optimum read position for each zone determined on the basis of an erase width table set on the basis of the measurement results shown in FIGS. 11A and 11B.

DETAILED DESCRIPTION

Figure 3:
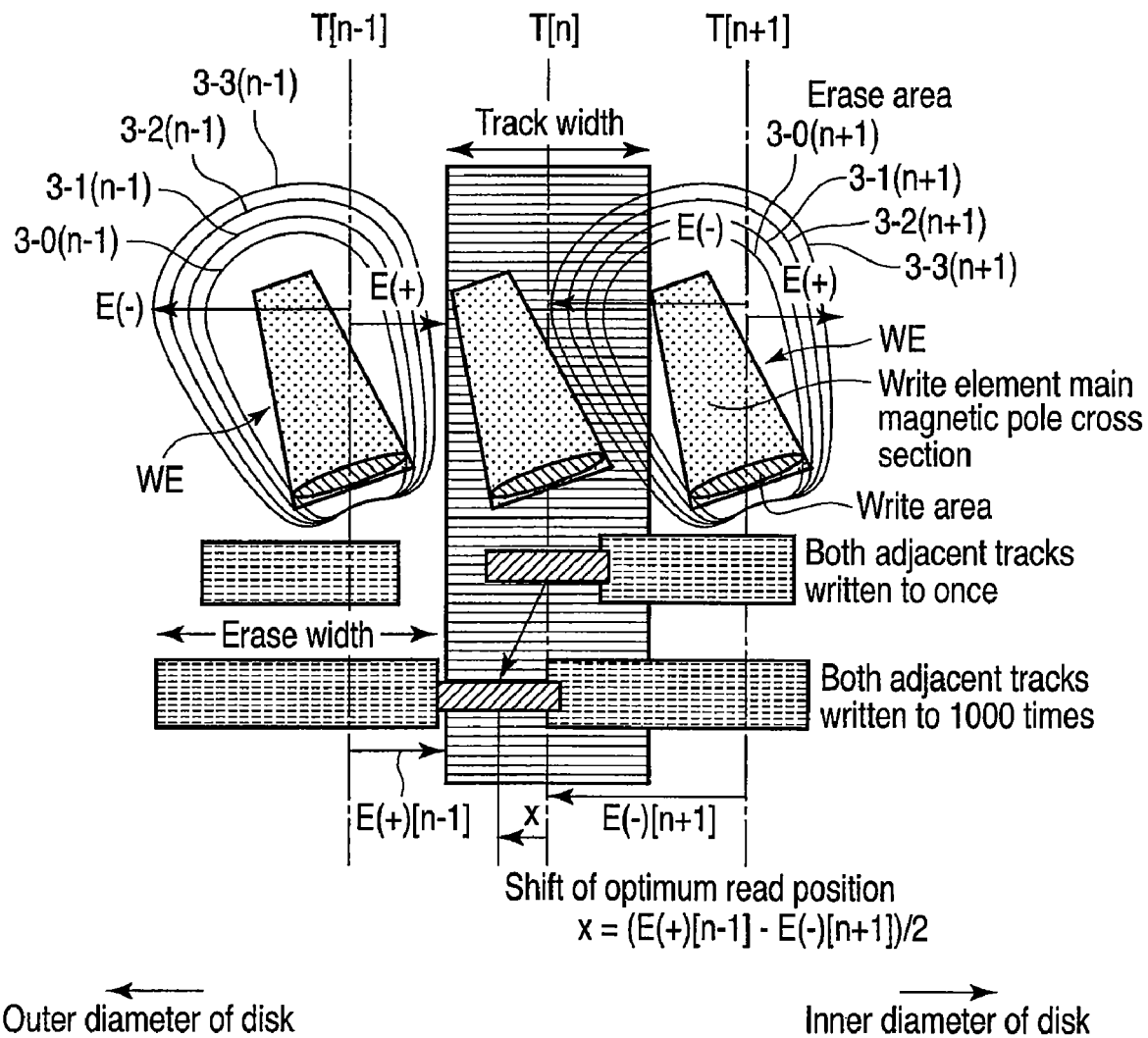
FIG. 3 is a schematic diagram to explain an exemplary relationship between the number of times data has been written to adjacent tracks and the optimum read position.

Various embodiments will be described hereinafter with reference to the accompanying drawings. In general, according to one embodiment, a magnetic disk drive comprises a write count memory, a read offset setting module and a controller. The write count memory is configured to store a write count for each track or for each zone on a disk. The read offset setting module is configured to set, in accordance with a write count for an adjacent track to a target track or for a zone to which the adjacent track belongs, an offset from a predetermined position on the target track in a read position in which a head is to be positioned when the head is positioned on the target track for data read. The write count is stored in the write count memory. The controller is configured to position the head in a position shifted from the predetermined position by the set offset.

FIG. 1 is a block diagram showing an exemplary configuration of an electronic device with a magnetic disk drive according to an embodiment. The electronic device of FIG. 1 comprises a magnetic disk drive (hereinafter, referred to as HDD) 10 and a host 20. The electronic device is, for example, a personal computer. The host 20 is connected to the HDD 10 via a host interface 21. The host 20 uses the HDD 10 as a storage device of the host 20.

The HDD 10 comprises a disk (magnetic disk) 11, a head (a magnetic head) 12, a spindle motor (SPM) 13, an actuator 14, and a controller 15. The disk 11 has an upper disk surface and a lower disk surface. For example, the upper disk surface of the disk 1 is a recording surface on which data is written magnetically.

The head 12 is arranged so as to correspond to the recording surface of the disk 11. The head 12 includes a read element RE (not shown) and a write element WE shown in FIG. 3. The head 12 reproduces data recorded on the disk 11 and records data on the disk 11. That is, the head 12 reads data from the disk 11 and writes data to the disk 11.

In FIG. 1, for convenience of drawing, the head 12 is arranged so as to correspond to the upper disk surface (recording surface) of the disk 11. Generally, however, the upper and lower surfaces of the disk 11 are recording surfaces and a head is arranged so as to correspond to each of the upper and lower surfaces. Therefore, in the explanation below, suppose the head 12 is arranged so as to correspond to each of the disk surfaces of the disk 11. Moreover, in the configuration of FIG. 1, it is assumed that the HDD 10 has a single disk 11. However, the HDD may have a plurality of disks 11 stacked one on top of another.

FIG. 2 is a conceptual diagram schematically showing a format of the disk 11. The disk 11 (more specifically, each recording surface of the disk 11) is managed by dividing the disk 11 radially into M zones $Z_0$ (#0) to $Z_{M-1}$ (#M-1). That is, the disk 11 has M zones $Z_0$ to $Z_{M-1}$. In the embodiment, M is 29 and each of zones $Z_0$ to $Z_{M-1}$ includes a plurality of tracks.

In FIG. 1, the disk 11 is rotated by the SPM 13 at high speed. The head 12 is attached to the tip of an arm 141 of the actuator 14. The disk 11 is rotated at high speed, causing the head to float over the disk 11. The actuator 14 includes a voice coil motor (VCM) 142 serving as a driving source of the actuator 14. The actuator 14 is driven by the VCM 142, causing the head 12 to move so as to draw an arc in a radial direction of the disk 11. Therefore, the angle between the center line of the arm of the actuator 14 and the track direction (i.e., a circumferential direction of the disk 11) differs according to the inner diameter zone, middle diameter zone, or outer diameter zone. That is, the angle between the write element WE (see FIG. 3) of the head 12 and a track also differs according to the inner diameter zone, middle diameter zone, or outer diameter zone of the disk 11. The angle is called a skew.

The controller 15 is realized by, for example, a system LSI where a plurality of elements including a microprocessor unit (MPU) and a memory are integrated into a single chip. The controller 15 exchanges signals with the host 20. Specifically, the controller 15 receives a command (e.g., a write command or a read command) transferred from the host 20 via a host interface 21. The controller 15 controls data transfer between the controller 15 and the host 20. The controller 15 further controls data transfer between the disk 11 and the controller 15 via the head 12. The controller 15 also controls the SPM 13 and VCM 142. The controller 15 controls the VCM 142 to position the head 12 on the target track.

As described above, the error rate in reading a first track tends to increase as the number of times a second track adjacent to the first track has been written to increases. The reason will be explained with reference to FIG. 3. FIG. 3 is a schematic diagram to explain the relationship between the number of times data has been written to adjacent tracks and the optimum read position. FIG. 3 shows three tracks T[n−1], T[n], and T[n+1] whose track numbers are consecutive. The track numbers of tracks T[n−1], T[n], and T[n+1] are [n−1], [n], and [n+1], respectively. In the example of FIG. 3, suppose track T[n−1] is the outer adjacent track and track T[n+1] is the inner adjacent track.

In FIG. 3, track T[n] is assumed to be a target track to be read from. Suppose data has been written to tracks T[n−1] and T[n+1] adjacent to track T[n] 1000 times. In addition, FIG. 3 schematically shows a state where the write element WE of the head 12 is positioned in a predetermined position on the track T[n−1]. The predetermined position on the track T[n−1] is, for example, the center line of the track T[n−1]. FIG. 3 further shows a state where the write element WE of the head 12 is positioned on, for example, the center line of track T[n+1] to write data to track T[n+1].

When data has been written to each of tracks T[n−1] and T[n+1], a region demagnetized due to a leakage magnetic field of the write element WE (hereinafter, referred to as an erase region) increases as the number of times data has been written increases. FIG. 3 shows erase regions 3-0(n−1), 3-1(n−1), 3-2(n−1), and 3-3(n−1) when the number of times data has been written to track T[n−1] is 1, 10, 100, and 1000, respectively. FIG. 3 further shows erase regions 3-0(n+1), 3-1(n+1), 3-2(n+1), and 3-3(n+1) when the number of times data is written to track T[n+1] is 1, 10, 100, and 1000, respectively.

As seen from FIG. 3, the write element WE form a skew angle with each of tracks T[n−1] and T[n+1]. Of course, the write element WE also forms a skew angle with track T[n]. When the write element WE forms a skew angle with track T[n−1], erase region 3-i(n−1) (i=0, 1, 2, 3) has unbalanced widths (hereinafter, referred to as erase widths) E(−) and E(+) in a radial direction of the disk 11 with respect to the center line of track T[n−1]. The same holds true for track T[n+1]. That is, when the write element WE forms a skew angle with track T[n+1], erase region 3-i(n+1) has unbalanced erase widths E(−) and E(+) with respect to the center line of track T[n+1]. The erase width E(−) and erase width E(+) may be called an outer side erase width and an inner side erase width, respectively.

In the example of FIG. 3, erase region 3-$i$(n+1) has a greater effect on track T[n] than erase region 3-$i$(n−1). In this case, a side of the track T[n] close to track T[n+1] is demagnetized more widely than another side of it. As described above, as the number of times that data has been written to tracks T[n−1] and T[n+1] (hereinafter, sometimes referred to as an adjacent track write count) increases, erase regions 3-$i$(n−1) and 3-$i$(n+1) become wider, respectively. Therefore, in the example of FIG. 3, as the adjacent track write count increases, the demagnetization of track T[n] progresses from the track T[n+1] side. In this situation, if the read element RE of the head 12 is positioned on the center line of track T[n] (i.e., target track T[n] to be read), the error rate in reading data from track T[n] will increase.

For example, when the adjacent track write count is 1, the optimum point of a read position (the optimum read position) where the error rate in reading data from track T[n] is the lowest is almost at the center line of track T[n] as is clear from FIG. 3. In contrast, when the adjacent track write count is, for example, 1000, the optimum read position shifts from the center line of track T[n] toward track T[n−1] as a result of the demagnetization of track T[n] progressing from the track T[n+1] side. Here, if the inner side erase width of track T[n−1] is E(+) and the outer side erase width of track T[n+1] is E(−), the optimum read position when the adjacent track write count is 1000 is a position shifted from the center line of track T[n] by x=((E(+)−E(−))/2 as shown in FIG. 3.

Figure 4A:
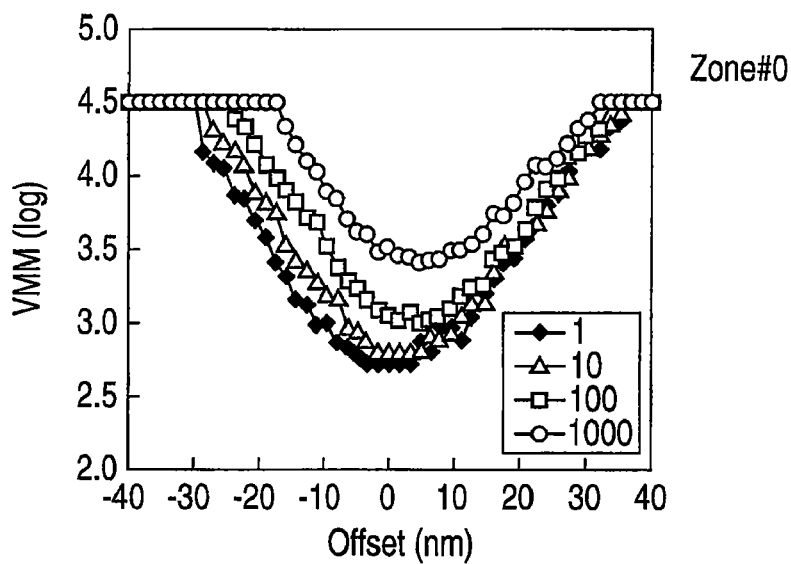
Figure 4B:
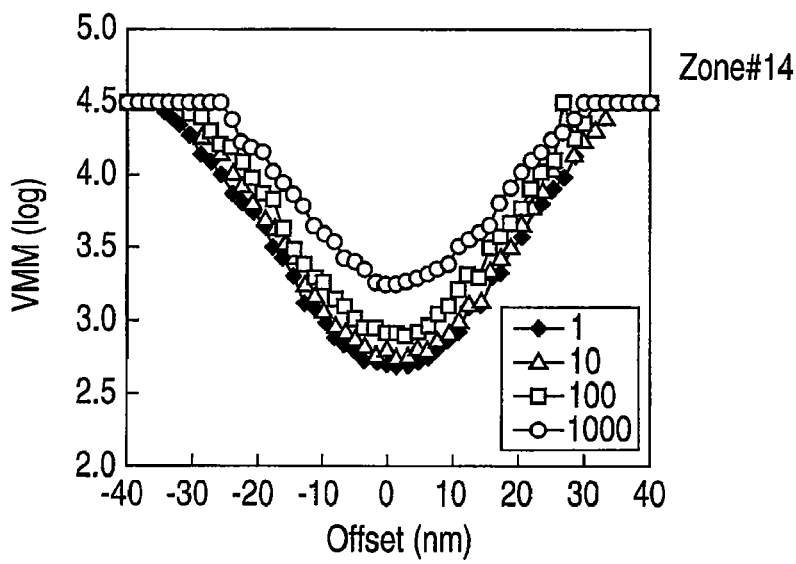
Figure 4C:
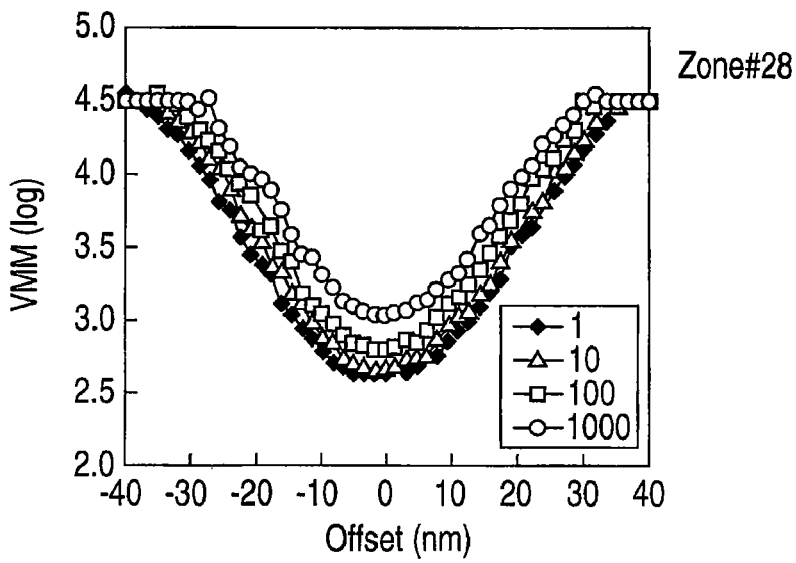

FIGS. 4A, 4B, and 4C show the results of measuring, on each track in the outer diameter zone #0, middle diameter zone #14, and inner diameter zone #28 of the disk 11 respectively, profiles of the probability of read error for each write count when data has been written to tracks T[n−1] and T[n+1] adjacent to a target track T[n] to be read from once, 10 times, 100 times, and 1000 times. The measurements were made repeatedly in a state where the read element RE of the head 12 (more specifically, the middle position of the read element RE) was located in a position (read position) shifted from the center line of the target track T[n] in units of a predetermined length in a radial direction of the disk 11. In the embodiment with M=29, the outer diameter zone, middle diameter zone, and inner diameter zone of the disk 11 are zones $Z_0$ (#0), $Z_{14}$ (#14), and $Z_{28}$ (#28).

Each of FIGS. 4A, 4B, and 4C shows the profiles of the probability of read error when the adjacent track write counts are 1, 10, 100, and 1000. In the examples of FIGS. 4A, 4B, and 4C, a known Viterbi metrics margin (VMM) that correlates well with the bit error rate. In each of FIGS. 4A, 4B, and 4C, the ordinate axis represents the VMM (more specifically, a logarithmic value of the VMM) and the abscissa axis represents an offset (in nanometers [nm]) from the center line of a target track T[n] in a read position.

It is seen from the profiles of the probability of read error (i.e., VMM profiles) shown in FIGS. 4A, 4B, and 4C that the VMM becomes worse as the adjacent track write count increases. In addition, it is also seen from FIGS. 4A, 4B, and 4C that the optimum point of a read position (the optimum read position) for obtaining the smallest value of the VMM starts to shift from the center line of the target track T[n]. That is, it is seen that the offset (hereinafter, sometimes referred to as the optimum read offset) starts to shift from the center line of the target track T[n] in the optimum read position.

Figures 5, 7:
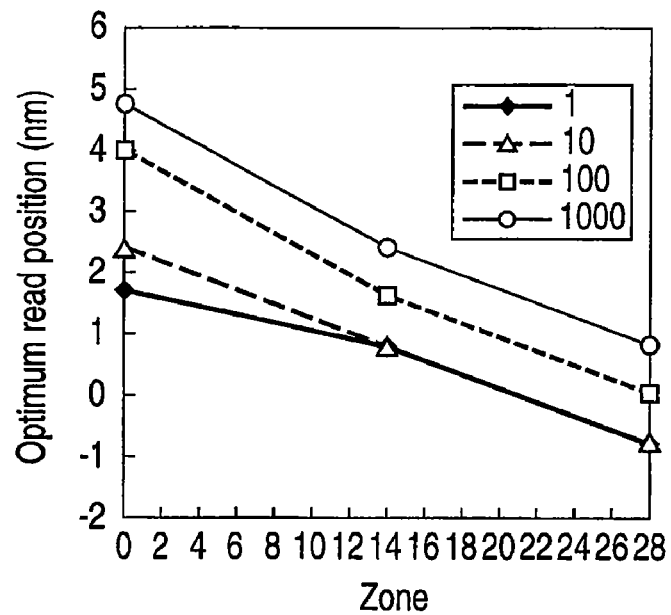
FIG. 5 shows a polygonal line graph where the optimum read positions for each write count obtained on the basis of the profiles shown in FIGS. 4A, 4B, and 4C are plotted for the zones #0, #14 and #28 respectively.
FIG. 7 shows an example of the storage format of a write count in a write count memory applied to the embodiment.

FIG. 5 shows a polygonal line graph where the optimum read positions for each of the adjacent track write counts, 1, 10, 100, and 1000, obtained on the basis of the VMM profiles shown in FIGS. 4A, 4B, and 4C are plotted on a zone basis. It is seen from FIG. 5 that, for example, when the adjacent track write count has reached 1000 in the outer diameter zone $Z_0$ (#0), the optimum read position is about 4.8 nm. That is, a shift of about 4.8 nm from the center line of the target track T[n] has occurred. Taking this shift, or the offset (read offset) into account, the following method can be applied to correct the read position to the optimum read position. The method is to carry out the process of searching for the optimum point at which the error rate or the VMM becomes the smallest by changing the read offset, for example, in units of a predetermined value. However, carrying out such a process impairs the performance of the HDD 10. To overcome this problem, the optimum read position is set using an erase width table 152 (see FIG. 6) as described below in the embodiment.

FIG. 6 is a block diagram showing a main configuration of the controller 15 together with a peripheral configuration related to the controller 15. The controller 15 comprises a write count memory 151, an erase width table 152, a command analysis module 153, an update module 154, a table access module 155, a read offset setting module 156, and a servo controller 157.

The write count memory 151 stores, for example, the number of times data has been written for each head in each cylinder (i.e., for each track) as a write count. FIG. 7 shows an example of the storage format of write counts in the write count memory 151. In the example of FIG. 7, a write count of track T[m, n] specified by head number m (m=0, 1) and cylinder number n (n=0, 1, . . . , p−1) is represented by N[m, n].

The erase width table 152 pre-stores erase widths E(+) and E(−) for each head in each cylinder and for each write count. That is, the erase width table 152 pre-stores erase widths E(+) and E(−) corresponding to the write count for each track. In the embodiment, the maximum value q of the write count is smaller than a threshold value used to determine whether to perform track refreshing, for example, "the threshold count −1." The erase widths E(+) and E(−) corresponding to the write count for each track can be measured and estimated in advance as described later. In the embodiment, on the basis of the measurement and estimation results, the erase width table 152 is set. The erase width table 152 is stored in a nonvolatile memory, such as a flash memory.

FIG. 8 shows an example of the data structure of the erase width table 152. In the example of FIG. 8, erase widths E(+) and E(−) corresponding to write count N (N=N[m, n]=0, 1, . . . , q) of track T[m, n] specified by head number m (m=0, 1) and cylinder number n (n=0, 1, . . . , p−1) are represented by E(+) [m, n, N] and E(−) [m, n, N], respectively.

FIG. 9 shows a diagram to explain the concept of erase widths E(+) and E(−) corresponding to the write count for each track stored in the erase width table 152. As seen from FIG. 9, inner side of the track in outer diameter zone of the disk has wider erase width E(+) than outer side of it and outer side of the track in inner diameter zone of the disk has wider erase width E(−) than inner side of it.

In FIG. 6, the command analysis module 153 analyzes a command transferred from the host 20 and controls the operation specified by the command. When data is written to track T[m, n] on the disk 11 in accordance with the analyzed command, the update module 154 increments the write count of the track T[m, n] stored in the write count memory 151. In addition, when tracks T[m, n−1] and T[m, n+1] adjacent to the track T[m, n] have been refreshed because the write count of track T[m, n] exceeded a threshold value for track refreshing, the update module 154 resets the write count of the track T[m, n] stored in the write count memory 151 to zero as in the conventional art.

When the analyzed command is a read command and the head 12 is positioned on a target track to read data from a track specified by the read command (i.e., the target track), the table access module 155 accesses the erase width table 152. The table access module 155 obtains from the erase width table 152 an inner side erase width E(+) corresponding to the write count (adjacent track write count) of a track adjacent to the target track on the outer diameter zone of the disk 11. The table access module 155 further obtains from the erase width table 152 an outer side erase width E(−) corresponding to the write count of a track adjacent to the target track on the inner diameter zone of the disk 11.

On the basis of the obtained inner side erase width E(+) and outer side erase width E(−), the read offset setting module 156 calculates an offset of the position (read position) on the target track in which the head 12 is to be positioned from the center line of the target track. The read offset setting module 156 sets the calculated offset as a read offset.

The servo controller 157 is a main element of a read positioning control system that positions the head 12 in the optimum read position. The servo controller 157 performs feedback control of the VCM 142 so as to suppress the shift (position error) of the head 12 (more specifically, the read element RE of the head 12) from the optimum read position.

Generally, the optimum read position is the position of the center line of the target track T[n]. In the embodiment, however, when the table access module 155 has obtained the inner side erase width E(+) of outer adjacent track T[n−1] and the outer side erase width E(−) of inner adjacent track T[n+1], the optimum read position is determined as follows. The optimum read position is determined to be a position shifted from the center line of the target track T[n] by x=(E(+)−E(−))/2. This is clear from the explanation with reference to FIGS. 3. (E(+)−E(−))/2 represents a read offset for positioning the read element RE of the head 12 in the optimum read position and is calculated by the read offset setting module 156.

Figure 10:
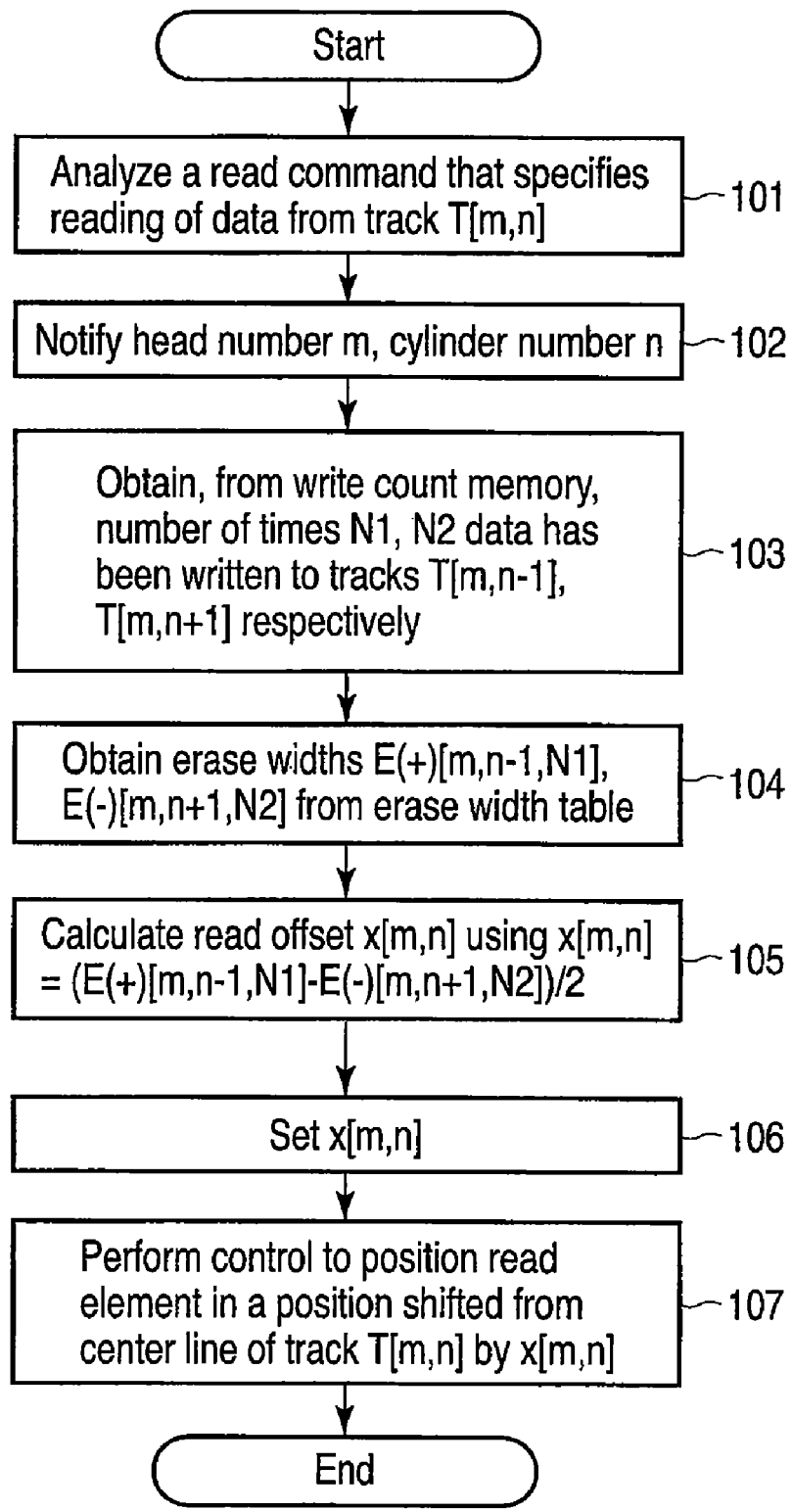
FIG. 10 is a flowchart to explain an exemplary procedure in positioning the head on the target track in accordance with a read command in the embodiment.

Next, the operation of the embodiment will be explained with reference to a flowchart in FIG. 10, using a case where the head 12 is positioned on the target track according to a read command transferred from the host 20 to the HDD 10. First, suppose the host 20 transfers a command to the HDD 10 and the transferred command is received by the controller 15 of the HDD 10. Suppose the received command is a read command that specifies the reading of data from track T[m, n] (i.e., target track T[m, n]) specified by head number m and cylinder number n. In addition, suppose a head specified by head number m is the head 12.

The command analysis module 153 of the controller 15 analyzes the received read command (block 101). On the basis of the result of analyzing the read command, control for positioning the middle position of the read element RE of the head 12 in the optimum read position is performed as follows in the controller 15. In the explanation below, a track adjacent to the target track T[m, n] on the outer diameter zone of the disk 11 is represented as track T[m, n−1] or outer adjacent track T[m, n−1]. In addition, a track adjacent to the target track T[m, n] on the inner zone of the disk 11 is represented as track T[m, n+1] or inner adjacent track T[m, n+1].

First, on the basis of the result of analyzing the read command, the command analysis module 153 informs the table access module 155 of the head number m and cylinder number n of the target track T[m, n] to be read (block 102). Then, referring to the write count memory 151, the table access module 155 obtains write counts N1 and N2 of tracks T[m, n−1] and T[m, n+1], respectively (block 103). That is, the table access module 155 obtains, as write count N1 of track T[m, n−1], write count N[m, n−1] stored in the write count memory 151 in association with a combination of head number m and cylinder number n−1. Write count N[m, n−1] represents the number of times data was written to track T[m, n−1]. In addition, the table access module 155 obtains, as write count N2 of track T[m, n+1], write count N[m, n+1] stored in the write count memory 151 in association with a combination of head number m and cylinder number n+1. Write count N[m, n+1] represents the number of times data was written to track T[m, n+1].

Next, the table access module 155 accesses the erase width table 152, thereby acquiring erase widths E(+)[m, n−1, N1] and E(−)[m, n+1, N2] (block 104). That is, the table access module 155 obtains, as erase width E(+)[m, n−1, N1], inner side erase width E(+) of the two erase widths stored in the erase width table 152 in association with a combination of track T[m, n−1] and write count N1. In addition, the table access module 155 obtains, as erase width E(−)[m, n+1, N2], outer side erase width E(−) of the two erase widths stored in the erase width table 152 in association with a combination of track T[m, n+1] and write count N2.

As described above, in the embodiment, erase widths E(+)[m, n−1, N1] and E(−)[m, n+1, N2] can be obtained directly from the erase width table 152, because erase widths E(+) and E(−) corresponding to combinations of all the tracks on the disk 11 and all the write counts up to the maximum value q have been stored in the erase width table 152.

The erase width table 152 may store only erase widths E(+) and E(−) corresponding to predetermined write counts of predetermined tracks. For example, the erase width table 152 may store only erase widths E(+) and E(−) corresponding to each of the write counts, 1, 10, 100, and 1000, of predetermined tracks whose relative positions in zones $Z_0$ to $Z_{28}$ (M=29) are the same. Each of the predetermined tracks will be hereinafter referred to as a representative track. In this configuration, suppose an erase width (i.e., an erase width to be obtained) corresponding to a combination of track T[m, n−1] and write count N1 or an erase width (i.e., an erase width to be obtained) corresponding to a combination of track T[m, n+1] and write count N2 have not been stored in the erase width table 152. In this case, the erase width to be obtained should be determined by a known interpolation method (e.g., linear interpolation method) on the basis of the erase width table 152.

In addition, for example, inner side erase width E(+) stored in the erase width table 152 in association with a track and a write count closest to track T[m, n−1] and write count N1 respectively may be used as erase width E(+)[m, n−1, N1]. Similarly, outer side erase width E(−) stored in the erase width table 152 in association with a track and a write count closest to track T[m, n+1] and write count N2 respectively may be used as erase width E(−)[m, n+1, N2].

On the basis of erase widths E(+)[m, n−1, N1] and E(−)[m, n+1, N2] obtained by the table access module 155, the read offset setting module 156 calculates a read offset (i.e., optimum read offset) x[m, n] in positioning the read element RE of the head 12 in the optimum read position of the target track T[m, n] (block 105). More specifically, the read offset setting module 156 calculates a read offset x[m, n] using the following equation:

$$x[m,n]=(E(+)[m,n-1,N1]-E(-)[m,n+1,N2])/2$$

As is clear from this, it would be safe to say that erase widths E(+) and E(−) corresponding to counts for each track stored in the erase width table 152 are read offset parameter values for determining a read offset. The read offset setting module 156 sets the calculated read offset x[m, n] in a read positioning control system 158 (block 106).

In the read positioning control system 158, the set read offset x[m, n] is added to the position of the center line of target track T[m, n] (a normal target position). The position indicated by the addition result is determined to be a new target position, that is, the optimum read position. The servo controller 157 of the read positioning control system 158 controls the VCM 142 so that the read element RE of the head 12 may be positioned in the new target position. That is, the servo controller 157 performs positioning control to position the read element RE of the head 12 in the optimum read position shifted from the position of the center line of the target track T[m, n] by read offset x[m, n] (block 107). If the position of the center line of the target track T[m, n] is at 0, the optimum read position coincides with read offset x[m, n].

As described above, according to the embodiment, the read position is corrected on the basis of the inner side erase width E(+)[m, n−1, N1] and the outer side erase width E(−)[m, n+1, N2]. The inner side erase width E(+)[m, n−1, N1] corresponds to write count N1 of the outer adjacent track T[m, n−1] with respect to the target track T[m, n]. The outer side erase width E(−)[m, n+1, N2] corresponds to write count N2 of the inner adjacent track T[m, n+1] with respect to the target track T[m, n]. That is, according to the embodiment, the shift of the position of the read element of the head 12 from the optimum read position where the error rate becomes the smallest is corrected, causing the read element to be positioned in the optimum read position.

Generally, as the number of times data has been written to a track adjacent to the target track increases, the erase region (erase width) of the adjacent track becomes wider. Then, the error rate in reading data from the target track becomes higher. In the embodiment, however, since the read element of the head 12 is positioned in the optimum read position, the error rate can be prevented from increasing.

The effect of the embodiment will be explained with reference to FIGS. 11A, 11B, and 11C. FIG. 11A shows the result of measuring an inner side erase width for each zone on the recording surface of the disk 11 corresponding to the head 12 for each of the adjacent track write counts 1, 10, 100, and 1000. FIG. 11B shows the result of measuring an outer side erase width for each zone on the recording surface of the disk 11 corresponding to the head 12 for each of the adjacent track write counts, 1, 10, 100, and 1000. Here, the inner side erase width and outer side erase width of a representative track in each of zones $Z_0$ to $Z_{28}$ (M=29) are measured as an inner side erase width and outer side erase width in each of zones $Z_0$ to $Z_{28}$.

FIG. 11A also shows curves 111a, 112a, 113a, and 114a obtained by approximating the result of measuring an inner side erase width for each zone for each of the adjacent track write counts, 1, 10, 100, and 1000, by polynomial expressions (e.g., quadratic polynomial expressions) respectively. FIG. 11B also shows curves 111b, 112b, 113b, and 114b obtained by approximating the result of measuring an outer side erase width for each zone for each of the adjacent track write counts, 1, 10, 100, and 1000, by polynomial expressions (e.g., quadratic polynomial expressions) respectively.

The curves 111a, 112a, 113a, 114a, 111b, 112b, 113b, 114b are approximated by specific polynomial expressions. These curves differ in the coefficient of the polynomial (polynomial coefficient). The erase width table 152 with the data structure of FIG. 8 has been set on the basis of the measurement results shown in FIGS. 11A and 11B (more specifically, curves obtained from the measurement results). That is, an inner side erase width and an outer side erase width corresponding to each of the adjacent track write counts, 1, 10, 100, and 1000, for tracks excluding the representative track in each zone are determined (estimated) from the above curves. In addition, an inner side erase width and an outer side erase width corresponding to write counts other than the adjacent track write counts, 1, 10, 100, and 1000, for each track are determined by interpolation from the above curves.

Each of the curves 111a, 112a, 113a, 114a, 111b, 112b, 113b, and 114b can be specified by a polynomial expression and the corresponding polynomial coefficient. Therefore, polynomial coefficients corresponding to the curves 111a, 112a, 113a, 114a, 111b, 112b, 113b, 114b respectively may be pre-stored in a nonvolatile memory and a corresponding polynomial coefficient may be used instead of the erase width table 152 as needed. That is, on the basis of a polynomial expression and a polynomial coefficient corresponding to a target adjacent track write count, an inner side erase width and an outer side erase width for each of the outer adjacent track and inner adjacent track for the target track may be calculated. The curves 111a, 112a, 113a, 114a, 111b, 112b, 113b, and 114b (or The polynomial expressions corresponding to the curves 111a, 112a, 113a, 114a, 111b, 112b, 113b, 114b, respectively) depend on a write count for each track or zone. Therefore, the read offset setting module 156 can set a read offset x on the basis of a write count for each track or zone.

For the sake of comparison with FIG. 5, FIG. 11C shows an example of curves representing the optimum read position (=read offset) x for each zone for each of the adjacent track write counts, 1, 10, 100, 1000, determined on the basis of the erase width table 152 set as described above. Suppose data is read from target track T[n] in zone $Z_0$ (#0) located, for example, in the outer zone of the disk 11. At this time, if the number of times data has been written to adjacent tracks T[n−1] and T[n+1] is 1000, the optimum read position shown in FIG. 11 is about 4 nm. This value is sufficient to compensate for the shift of the optimum point (read position) where the VMM of FIG. 4A becomes the smallest from the center line of the target track T[n].

That is, according to the embodiment, the positioning of the read element RE of the head 12 is controlled on the basis of the optimum read position (read offset) x corresponding to the zone to which the target track belongs, which makes it possible to reduce the error rate in reading data from the target track. If a read error should have occurred, the number of repetitions can be decreased in a read retry process of repeating the operation (i.e., offset search) of searching for the optimum point of a read position by shifting the read position in units of, for example, a predetermined offset amount. The reason is that the starting position of offset search gets closer to the optimum point. This enables the performance of the HDD 10 to be improved.

[First Modification]

Next, a first modification of the embodiment will be explained with reference to FIG. 6. In the embodiment, the write count memory 151 has stored the number of times writing has been done for each track (i.e., for each head in each cylinder) as a write count. In contrast, in the first modification, the write count memory 151 stores the number of times writing has been done for each zone (more specifically, for each head in each zone) as a write count. The write count for each zone is the sum of the number of times all the tracks belonging to the corresponding zone have been written to. On the other hand, the erase width table 152 pre-stores erase widths E(+) and E(−) for each zone (for each head in each zone) and for each write count.

In this case, the table access module 55 obtains from the write count memory 151 the write count of a zone to which an outer adjacent track adjacent to the target track on the outer diameter zone of the disk 11 belongs and the write count of a zone to which an inner adjacent track adjacent to the target track on the inner diameter zone of the disk 11 belongs. In addition, the table access module 155 obtains from the erase width table 152 an erase width E(+) and an erase width E(−) corresponding to the obtained write count of a zone to which the outer adjacent track belongs and the obtained write count of a zone to which the inner adjacent track belongs, respectively. The first modification is suitable for a case where data is written uniformly to each track in each zone. According to the first modification, the storage capacity necessary for the write count memory 151 and erase width table 152 can be reduced.

[Second Modification]

Next, a second modification of the embodiment will be explained with reference to FIG. 6. In the second embodiment, the write count memory 151 stores the number of times writing has been done for each sector in each track (i.e., for each head in each cylinder) as a write count. Suppose a target track is track T[m, n]. In this case, the table access module 155 obtains, from the write count memory 151, write count N1 of a first sector in track T[m, n−1] adjacent to a target sector (i.e., a sector from which data is to be read) in track T[m, n]. The table access module 155 further obtains, from the write count memory 151, write count N2 of a second sector in track T[m, n+1] adjacent to the target sector in track T[m, n].

Next, the table access module 155 uses the obtained write count N1 of the first sector in track T[m, n−1] and the obtained write count N2 of the second sector in track T[m, n+1] as write count N1 of track T[m, n−1] and write count N2 of track T[m, n+1], respectively. By doing this, the table access module 155 obtains erase widths E(+)[m, n−1, N1] and E(−)[m, n+1, N2] as in the embodiment. Subsequent operations are the same as those in the embodiment. In the second modification, too, the error rate in reading data from the target sector in target track T[m, n] can be reduced efficiently. The second modification is suitable for a case where the write count differs greatly between sectors in a track.

According to at least one of the embodiments described above, it is possible to provide a magnetic disk drive using an offset in positioning the head to read data and a head positioning method which are capable of preventing the degradation of the read error rate or an increase in the number of occurrences of read retry resulting from an increase in the write count.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk drive comprising:
a write count memory configured to store a write count for each track or for each zone on a disk;
a table in which a result of measuring an erase width corresponding to the write count for each track or for each zone has been stored as a read offset parameter value, the read offset parameter value being used to determine an offset from a predetermined position on a target track in a read position in which a head is to be positioned, the result of measuring the erase width including a first erase width E(+) in an inner direction of the disk and a second erase width E(−) in an outer direction of the disk, the first erase width E(+) and the second erase width E(−) both using the predetermined position in the corresponding track or each track belonging to the corresponding zone as a reference;
a table access module configured to obtain a first erase width E(+) corresponding to a first write count stored in the write count memory and a second erase width E(−) corresponding to a second write count stored in the write count memory by accessing the table in accordance with the first write count and the second write count when the head is positioned on the target track for data read, the first write count being a write count for an outer adjacent track or for a zone to which the outer adjacent track belongs and the second write count being a write count for an inner adjacent track or for a zone to which the inner adjacent track belongs, the outer adjacent track being adjacent to the target track on an outer diameter zone of the disk and the inner adjacent track being adjacent to the target track on an inner diameter zone of the disk;
a read offset setting module configured to set the offset based on the obtained first erase width E(+) and second erase width E(−); and
a controller configured to position the head in a position shifted from the predetermined position by the set offset.

2. The magnetic disk drive of claim 1, wherein the read offset setting module is further configured to determine the offset by calculating (E(+)−E(−))/2.

3. The magnetic disk drive of claim 2, wherein the table access module is further configured to interpolate, based on the table, the first erase width E(+) corresponding to the first write count or the second erase width E(−) corresponding to the second write count if the first erase width E(+) or the second erase width E(−) has not been stored in the table.

4. The magnetic disk drive of claim 2, wherein the table access module is further configured:
to obtain, as the first erase width E(+) from the table, an erase width E(+) corresponding to a first track or a first zone for which a write count is closest to the first write count if the first erase width E(+) corresponding to the first write count has not been stored in the table; and
to obtain, as the second erase width E(−) from the table, an erase width E(−) corresponding to a second track or a second zone for which a write count is closest to the second write count if the second erase width E(−) corresponding to the second write count has not been stored in the table.

5. A method of positioning a head on a target track in a magnetic disk drive which comprises a write count memory which stores a write count for each track or for each zone on a disk and a table in which a result of measuring an erase width corresponding to the write count for each track or for each zone has been stored as a read offset parameter value, the read offset parameter value being used to determine an offset from a predetermined position on a target track in a read position in which a head is to be positioned, the result of measuring the erase width including a first erase width E(+) in an inner direction of the disk and a second erase width E(−) in an outer direction of the disk, the first erase width E(+) and the second erase width E(−) both using the predetermined position in the corresponding track or each track belonging to the corresponding zone as a reference, the method comprising:

obtaining a first write count and a second write count stored in the write count memory when the head is positioned on the target track for data read, the first write count being a write count for an outer adjacent track or for a zone to which the outer adjacent track belongs and the second write count being a write count for an inner adjacent track or for a zone to which the inner adjacent track belongs, the outer adjacent track being adjacent to the target track on an outer diameter zone of the disk and the inner adjacent track being adjacent to the target track on an inner diameter zone of the disk;

obtaining a first erase width E(+) corresponding to the first write count and a second erase width E(−) corresponding to the second write count by accessing the table;

setting the offset based on the obtained first erase width E(+) and second erase width E(−); and positioning the head in a position shifted from the predetermined position by the set offset.

6. The method of claim 5, further comprising determining the offset by calculating $(E(+)-E(-))/2$.

7. The method of claim 6, further comprising interpolating, based on the table, the first erase width E(+) corresponding to the first write count or the second erase width E(−) corresponding to the second write count if the first erase width E(+) or the second erase width E(−) has not been stored in the table.

8. The method of claim 6, further comprising:

obtaining, as the first erase width E(+) from the table, an erase width E(+) corresponding to a first track or a first zone for which a write count is closest to the first write count if the first erase width E(+) corresponding to the first write count has not been stored in the table; and obtaining, as the second erase width E(−) from the table, an erase width E(−) corresponding to a second track or a second zone for which a write count is closest to the second write count if the second erase width E(−) corresponding to the second write count has not been stored in the table.

* * * * *